(12) United States Patent
Fukumoto

(10) Patent No.: US 11,474,606 B2
(45) Date of Patent: Oct. 18, 2022

(54) POINTING DEVICE

(71) Applicant: MICROSOFT TECHNOLOGY LICENSING, LLC, Redmond, WA (US)

(72) Inventor: Masaaki Fukumoto, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/475,073

(22) PCT Filed: Dec. 30, 2016

(86) PCT No.: PCT/CN2016/113799
§ 371 (c)(1),
(2) Date: Jun. 28, 2019

(87) PCT Pub. No.: WO2018/120152
PCT Pub. Date: Jul. 5, 2018

(65) Prior Publication Data
US 2019/0332178 A1 Oct. 31, 2019

(51) Int. Cl.
*G06F 3/0338* (2013.01)
*G06F 3/01* (2006.01)
(Continued)

(52) U.S. Cl.
CPC ............. *G06F 3/016* (2013.01); *G06F 3/0338* (2013.01); *G06F 3/03547* (2013.01); *G06F 3/04146* (2019.05)

(58) Field of Classification Search
CPC ....... G06F 2203/04106; G06F 3/03547; G06F 3/0416; G06F 3/011; G06F 3/016;
(Continued)

(56) References Cited

U.S. PATENT DOCUMENTS 4,313,113 A    1/1982  Thornburg
5,231,386 A *  7/1993  Brandenburg ......... G05G 9/047
                                                200/5 R
(Continued)

FOREIGN PATENT DOCUMENTS

CN    1315030 A     9/2001
CN    101349949 A   1/2009
(Continued)

OTHER PUBLICATIONS

"How to use the TrackPoint center button—ThinkPad", Retrieved from https://support.lenovo.com/in/en/solutions/ht000611, Jun. 17, 2014, 3 Pages.
(Continued)

*Primary Examiner* — Phenuel S Salomon

(57) ABSTRACT

Embodiments of the subject matter described herein provide an apparatus for use in a pointing device. The apparatus includes an interacting body and a depressible force sensing layer. The rigid interacting body is operable to receive and translate a force provided by a tool. The depressible force sensing layer has an embossed portion that is arranged between the interacting body and a substrate. The embossed portion includes a first surface in contact with a second surface of the interacting body, and a profile of the first surface is substantially same as a profile of the second surface of the interacting body.

20 Claims, 6 Drawing Sheets

(51) Int. Cl.
*G06F 3/041* (2006.01)
*G06F 3/0354* (2013.01)

(58) Field of Classification Search
CPC .... G06F 3/0414; G06F 3/0426; G06F 3/0338; G06F 2203/04101; G06F 2203/04104; G06F 2203/04113; G06F 2203/04809; G06F 3/0354; G06F 3/041; G06F 2203/04102; G06F 2203/04808; G06F 3/0216; G06F 3/033
See application file for complete search history.

(56) References Cited

U.S. PATENT DOCUMENTS

| | | | |
|---|---|---|---|
| 5,432,530 A | 7/1995 | Arita et al. | |
| 5,508,719 A | 4/1996 | Gervais | |
| 5,691,747 A | 11/1997 | Amano | |
| 5,912,612 A * | 6/1999 | DeVolpi | G05G 9/047 200/512 |
| 6,515,651 B1 * | 2/2003 | Berstis | G06F 3/0338 345/157 |
| 6,762,748 B2 | 7/2004 | Maatta et al. | |
| 7,554,167 B2 | 6/2009 | Vaganov | |
| 7,772,657 B2 | 8/2010 | Vaganov | |
| 8,054,291 B2 | 11/2011 | Takatsuka | |
| 2003/0128181 A1 | 7/2003 | Poole | |
| 2003/0232516 A1 * | 12/2003 | Bedell | H01R 13/2414 439/66 |
| 2005/0060592 A1 * | 3/2005 | Sato | H01H 25/008 713/320 |
| 2006/0028442 A1 * | 2/2006 | Bynum | G06F 3/0421 345/157 |
| 2006/0267937 A1 * | 11/2006 | Takatsuka | G06F 3/03548 345/160 |
| 2008/0131184 A1 * | 6/2008 | Brown | G06F 3/0238 400/490 |
| 2009/0033521 A1 * | 2/2009 | Ladouceur | H01H 13/84 455/556.1 |
| 2010/0156844 A1 | 6/2010 | Paleczny et al. | |
| 2011/0315536 A1 | 12/2011 | Chiou et al. | |
| 2014/0203953 A1 * | 7/2014 | Moser | G06F 3/0202 341/27 |
| 2015/0227216 A1 | 8/2015 | Fukumoto | |
| 2015/0227217 A1 | 8/2015 | Fukumoto | |
| 2015/0324018 A1 * | 11/2015 | Hinson | G06F 3/03545 345/179 |
| 2016/0103505 A1 * | 4/2016 | Fukumoto | G06F 3/03547 345/161 |
| 2016/0118982 A1 | 4/2016 | Lee et al. | |

FOREIGN PATENT DOCUMENTS

| | | |
|---|---|---|
| CN | 201222234 Y | 4/2009 |
| CN | 101641663 A | 2/2010 |
| CN | 102023725 A | 4/2011 |
| CN | 204390196 U | 6/2015 |
| EP | 1736853 A2 | 12/2006 |
| JP | 2009169567 A | 7/2009 |
| JP | 2016066133 A | 4/2016 |
| TW | 201324253 A | 6/2013 |

OTHER PUBLICATIONS

"International Search Report and Written Opinion Issued in PCT Application No. PCT/CN2017/071179", dated Oct. 11, 2017, 11 Pages.
International Search Report and Written Opinion for PCT/CN2016/113799, dated Oct. 12, 2017.
"Office Action Issued in European Patent Application No. 16925624.5", dated Oct. 15, 2021, 6 Pages.
"Extended European Search Report Issued In European Patent Application No. 16925624.5", dated July 27, 2020, 7 Pages.
"First Office Action and Search Report Issued in Chinese Patent Application No. 201680091929.7", dated Dec. 24, 2021, 17 Pages.
"Second Office Action Issued in Chinese Patent Application No. 201680091929.7", dated Jun. 16, 2022, 7 Pages.

* cited by examiner

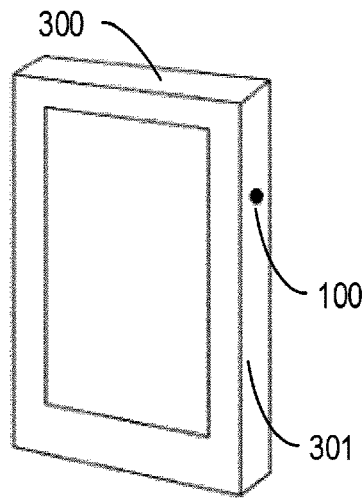
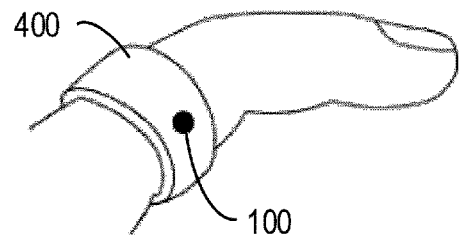
FIG. 4a        FIG. 4b
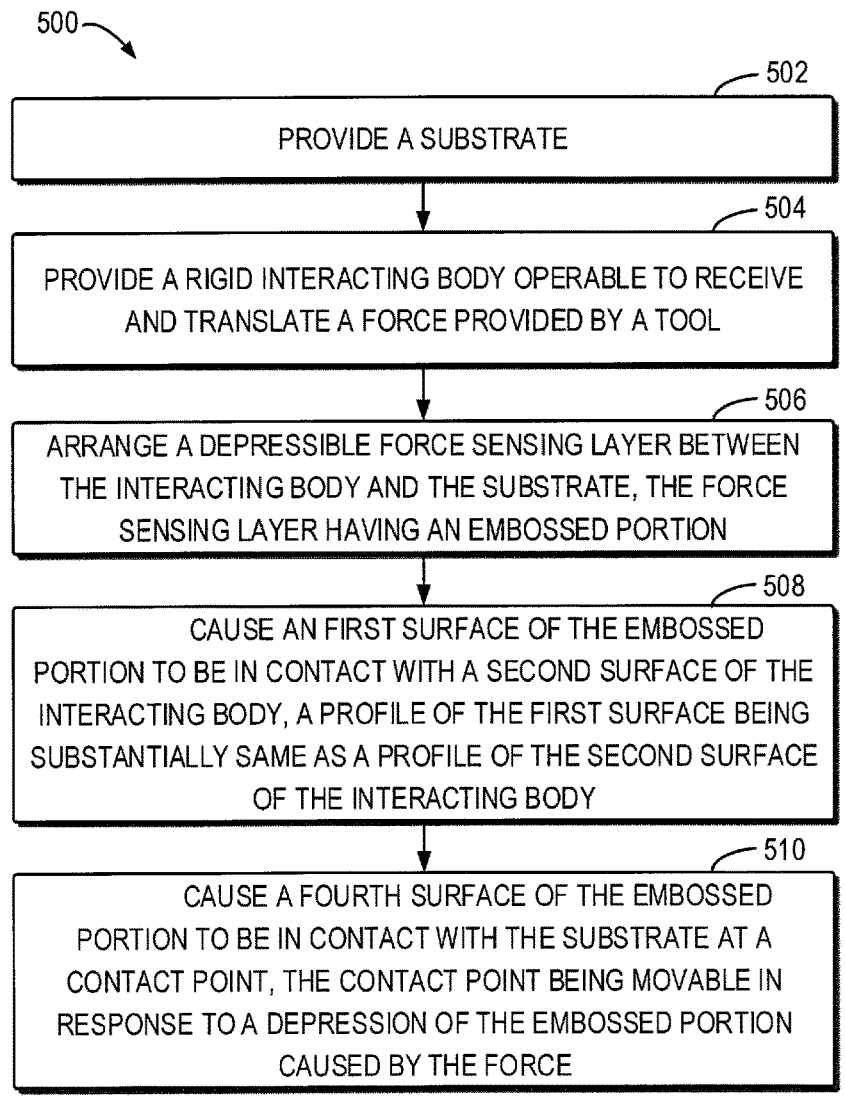
FIG. 5

POINTING DEVICE

CROSS-REFERENCE TO RELATED APPLICATION

This application is a U.S. National Stage Application of PCT/CN2016/113799, filed Dec. 30, 2016, which application is hereby incorporated by reference. To the extent appropriate, a claim of priority is made to each of the above disclosed application.

BACKGROUND

Pointing devices, such as mouse, track balls, and track sticks, have been widely used in various fields. A pointing device can facilitate a user to locate a cursor at a target position on a user interface. Among various pointing devices, pointing sticks functioning as small joysticks, are integrated on a laptop and can be manipulated by a user's finger to control a cursor's movement on the display. As one of the most commonly-used input devices, performance of such a pointing stick, such as response speed and overall size, may have a direct impact on the operation efficiency and user experience.

SUMMARY

Embodiments of the subject matter described herein provide an apparatus for use in a pointing device and the associated pointing device. The apparatus for use in a point device generally includes an interacting body and a depressible force sensing layer. The interacting body is made of rigid material and operable to receive and translate a force provided by a tool. The depressible force sensing layer is arranged between the interacting body and a substrate. The force sensing layer has an embossed portion, and the embossed portion further includes a first surface. The first surface of the embossed portion is in contact with a second surface of the interacting body. A profile of the first surface is substantially same as a profile of the second surface of the interacting body.

Compared to the conventional pointing devices, especially the conventional pointing sticks or tracking points, which may not be able to provide quick enough response to user's operation, the pointing device described herein may provide a speedy response which leads to a better user experience. Meanwhile, the pointing device described herein may have small form factor, which makes it possible to be integrated on small devices such as smart phone or a wearable electronic device to achieve a pointing function.

It is to be understood that the Summary is not intended to identify key or essential features of implementations of the subject matter described herein, nor is it intended to be used to limit the scope of the subject matter described herein. Other features of the subject matter described herein will become easily comprehensible through the description below.

DESCRIPTION OF DRAWINGS

The above and other objectives, features and advantages of the subject matter described herein will become more apparent through more detailed depiction of example embodiments of the subject matter described herein in conjunction with the accompanying drawings, wherein in the example embodiments of the subject matter described herein, same reference numerals usually represent same components.

FIG. 1c shows the corresponding position output of the contact point of FIG. 1a.

FIG. 3c shows the corresponding position output of the contact point of FIG. 3a.

FIG. 4a shows a schematic diagram of a smart phone mounted with the pointing device according to embodiments of the present disclosure.

FIG. 4b shows a schematic diagram of a wearable device mounted with the pointing device according to embodiments of the present disclosure.

FIG. 5 illustrates a flowchart of a method for manufacturing the apparatus for use in a pointing device, according to embodiments of the present disclosure.

Throughout the drawings, the same or similar reference symbols are used to indicate the same or similar elements.

DETAILED DESCRIPTION OF EMBODIMENTS

Figure 1A:
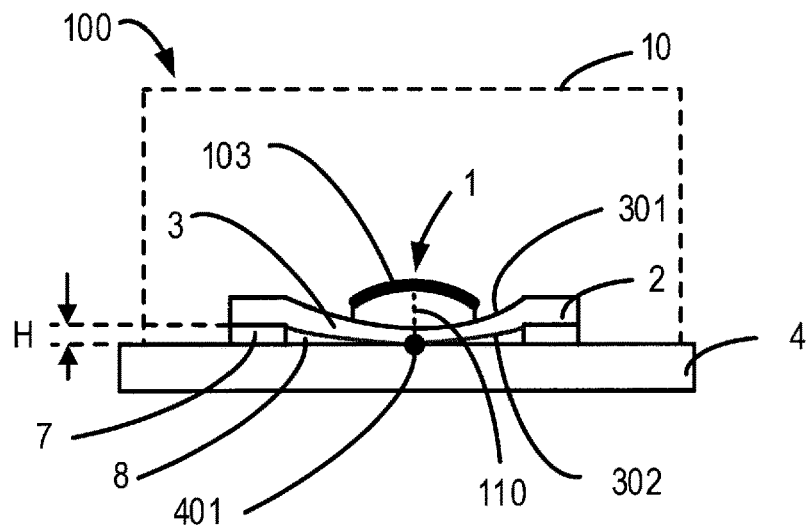
FIG. 1a is a schematic diagram illustrating the apparatus for use in a pointing device with no applied force thereon, according to embodiments of the present disclosure.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

As used herein, the phrase "include(s)" and its variants shall be interpreted as an open term meaning "including but not limited to." The phrase "based on" shall be interpreted as "at least partially based on." The phrase "an embodiment" or "one embodiment" shall be interpreted as "at least one embodiment." The term "a" shall be interpreted as "one or more" unless otherwise specified. The phrase "another embodiment" shall be interpreted as "at least one other embodiment." The phrases like "first" and "second" may refer to different or the same objects. Other definitions might also be included explicitly and implicitly in the following description.

Some values or value ranges might be described in the following. It is to be understood that these values and value ranges are only for the purpose of illustration, which may be advantageous to practice the idea of the subject matter described herein. However, depiction of these examples is not intended to limit the scope of the subject matter described herein in any manner. According to the specific application scenarios and needs, the values or value ranges may be set otherwise.

For the sake of discussions, example implementations of the subject matter described herein will be described with reference to the pointing device 100. However, it is to be understood that such a pointing device 100 is described merely for the purpose of illustration, without suggesting any limitations as to the scope of the subject matter described herein. For example, the ideas and principles are applicable to a stand-alone apparatus 10 as well.

Figure 1B:
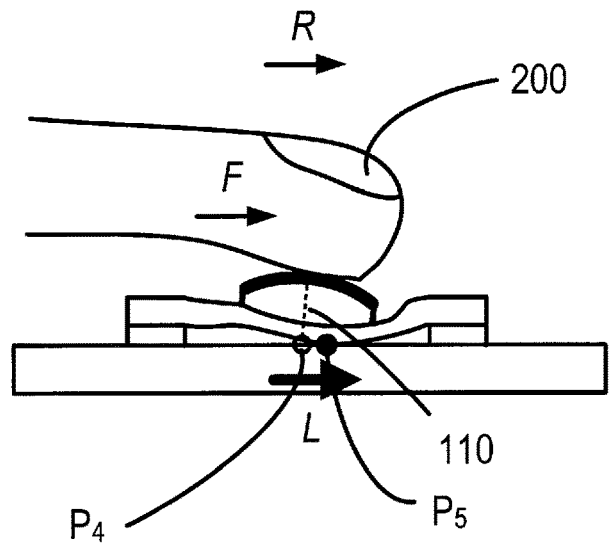
FIG. 1b is a schematic diagram illustrating the apparatus for use in a pointing device with an applied force thereon, according to embodiments of the present disclosure.

FIGS. 1a and 1b illustrate schematic side views of an apparatus 10 for use in a pointing device 100. As shown in FIG. 1a, the pointing device 100 generally includes an apparatus 10 and a substrate 4 coupled to one another. The apparatus 10 at least includes an interacting body 1 and a depressible force sensing layer 2, such as a depressible force sensing film. According to embodiments of the subject matter described herein, the depressible force sensing layer 2 is arranged between the interacting body 1 and the substrate 4.

In some embodiments, the force sensing layer 2 may be implemented as a force sensing resistive (FSR) layer such as FSR film, for example. In some alternative embodiments, the force sensing layer 2 may be a force sensing capacitive layer or the like.

According to embodiments of the subject matter described herein, the rigid interacting body 1 is a rigid body made of rigid material, such as plastic or metal. In operation, the interacting body 1 is able to receive and translate a force F provided by a tool 200. Although the tool 200 in FIG. 1b is embodied by a user's finger, it is to be understood that the tool 200 may also be embodied as pen, stylus, or any other appropriate actuating tools.

As further illustrated in FIG. 1a, the force sensing layer 2 is provided with an embossed portion 3 in the middle region of the force sensing layer 2. The embossed portion 3 has an upper surface 301 and a lower surface 302. The upper surface 301 is in contact with a lower surface 102 of the interacting body 1, and the lower surface 302 of the embossed portion is in contact with the substrate 4 at a contact point 401. For ease of discussions, hereafter the surfaces 301, 102, 101 and 302 may be also referred to as a first, second, third and fourth surfaces, respectively.

Figure 6A:
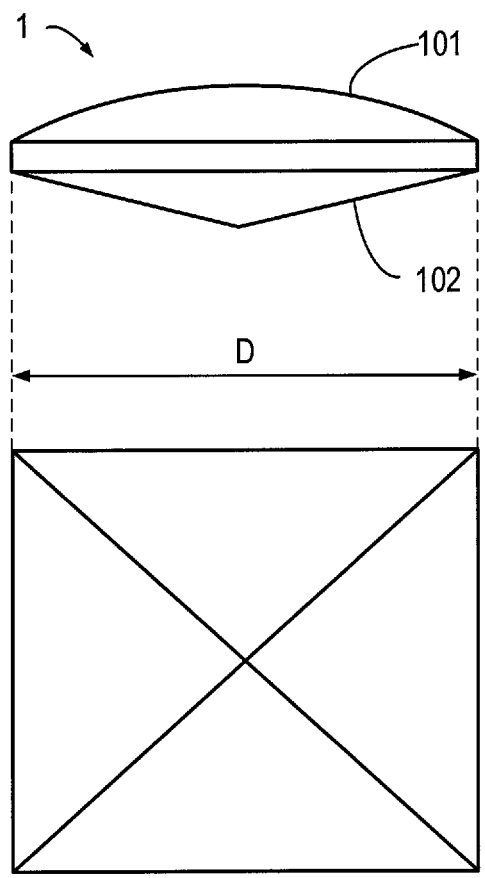
FIG. 6a shows an enlarged side view and bottom view of the ink blotter-shaped interacting body of an apparatus for use in a pointing device, according to an embodiment of the present disclosure.
Figure 6B:
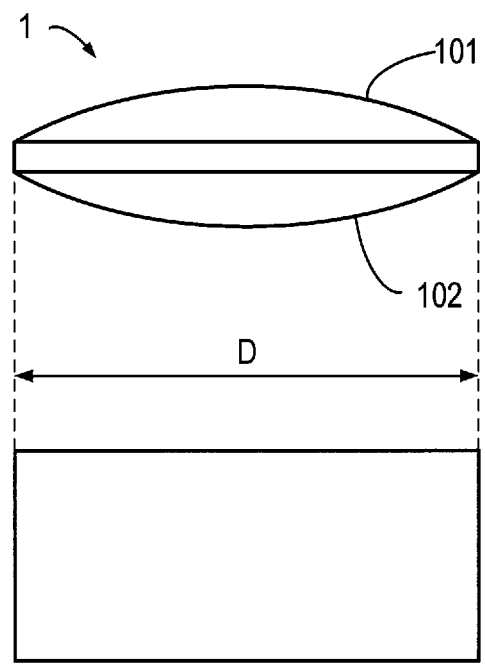
FIG. 6b shows an enlarged side view and bottom view of the inverted pyramid-shaped interacting body of an apparatus for use in a pointing device, according to another embodiment of the present disclosure.

It is to be understood that though FIGS. 1a-1b show a dome-shaped embossed pattern, other types of embossed patterns, such as inverted pyramid-shaped pattern for 2D control (FIG. 6a) or ink blotter-shaped pattern for 1D control (FIG. 6b) are also possible depending on the various applications. Further, the overall dimension or size of the embossed portion 3. That is, the diameter and center projection amount of emboss) may vary from applications as well. It will be appreciated that larger diameter usually provides a smooth cursor movement, and small diameter may provide a quick cursor movement.

In some embodiments as illustrated in FIG. 1a, the apparatus 10 may further include a mechanism 7 for creating a gap 8 between the substrate 4 and the force sensing layer 2. The gap 8 is used to receive/accommodate the embossed portion 3. In some embodiments, the gap-creating mechanism 7 may simply be fabricated with double adhesive tape. For example, for a dome-shaped embossed pattern, the gap-creating mechanism 7 may have a ring-shaped profile to follow the cross section of the embossed pattern.

In some embodiments, a typical height H of the gap 8 (or the typical thickness of the double adhesive tape) is in a range of 50-200 micrometers, and the typical sizes of inner and out rings are in a range of 8-17 millimeters and 10-20 millimeters, respectively.

By making the center projection amount of the embossed portion 3 slightly greater than the height H of the gap 8, a continuous and small-area contact with the substrate 4 can be achieved. According to embodiments of the subject matter described herein, the contact point 401 can be moved upon a depression of the embossed portion 3 that is caused by a force F. For example, while the tool 200 such a finger slides on the interacting body 1, the interacting body 1 will be slightly dipped to form a tilted angle. This causes a deformation/depression of the embossed portion 3, and the depression of the embossed portion 3 in turn causes the movement of the contact point 401.

Figure 1C:
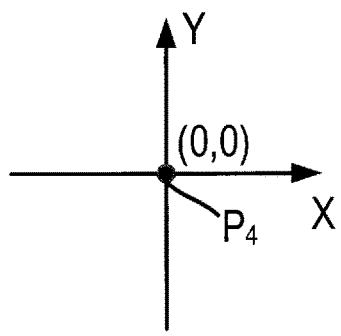

FIG. 1a shows a scenario that no force is applied on the upper surface of the interacting body 1, and FIG. 1c shows the corresponding position (for example, represented by coordinate values) of the contact point 401 on the substrate 4. As shown, when no force is applied, the interacting body 1 is centered on the substrate 4, as indicated by the dashed line 110 in FIG. 1a. In this case, the contact point 401 is located at $P_4$ (0, 0), which two-dimensional (2D) values represent the original position of the contact point 401.

Figure 1D:
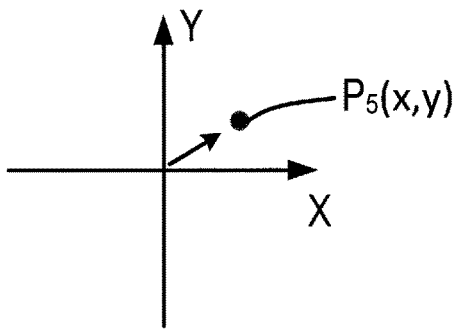
FIG. 1d shows the corresponding position output of the contact point of FIG. 1b.

FIG. 1b shows a scenario that a user's finger is applying a force F in a direction R on the upper surface of the interacting body 1. In this case, a tilt angle or a dip (as indicated by the dashed line 110 in FIG. 1b) of the interacting body 1 is formed, causing a deformation/depression of the force sensing layer 2. FIG. 1d shows the corresponding position (or coordinates) of the contact point 401 on the substrate 4. As shown, when there is a force F applied on the upper surface of the interacting body 1, the contact point 401 is moved along the direction L to another point $P_5$ that is deviated from the original point $P_4$. The point $P_5$ in FIG. 1d can be represented by the 2D coordinate values (x, y), for example.

According to embodiments of the subject matter described herein, when the finger is released from the interacting body 1, the tilt angle or the dip of the interacting body 1 as well as the deformation/depression of the force sensing layer 2 is dissolved, and consequently the contact point 401 will move back (for example, bounce back) from $P_5$ to its original position $P_4$. This means that both of the interacting body 1 and the force sensing layer 2 herein have a "spring" effect, which is important for the user experience when using a pointing stick.

In the conventional pointing stick structures, the interacting bodies are made of soft material, for example gel-based material, such as urethane, silicone or hydrogel. Due to the fact that the applied force will also introduce some deformation to the soft material itself, the movement of the contact point will be inevitably delayed by a small amount of time since the finger's movement, which will deteriorate the response speed of the pointing device 100. By contrast, according to embodiments of the subject matter described herein, due to the non-deformable/non-depressible characteristic, the rigid-material-based interacting body 1 enables a fast response to the user's finger movement compared to some conventional designs.

Furthermore, the properly designed "embossed" pattern enables a continuous/non-interrupted contact of the force sensing layer 2 with the substrate 4 via the contact point 401. On one hand, this eliminates the distance between the force sensing layer 2 and the substrate 4 at the contact point. The eliminated distance at the contact point 401 likewise facilitates a fast response speed of the pointing device, because the force sensing layer 2 now does not need to be first deformed to reach the substrate 4 to form a contact point 401, and then further deformed to cause the movement of the contact point 401. On the other hand, as mentioned above, the predefined projection of the embossed pattern along with the predefined gap height provides a controlled spot size of contact point 401, which may further improve the detection accuracy.

In some embodiments, the embossed portion 3 can be permanently shaped. This means, such permanently-shaped embossed portion 3 is self-maintained at room temperature, with no need for an additionally applied force to facilitate the maintenance of the embossed pattern.

In an example embodiment, the permanently-shaped farce sensing layer 2 has a thickness in a range of 25-100 micrometers, and the embossed portion 3 has a diameter in a range of 10-20 millimeters. It is to be noted that the range of layer thickness described as above is only exemplary. Various layer thicknesses may be considered depending on specific requirements, such as fabrication limits or the size requirement.

Figure 2:
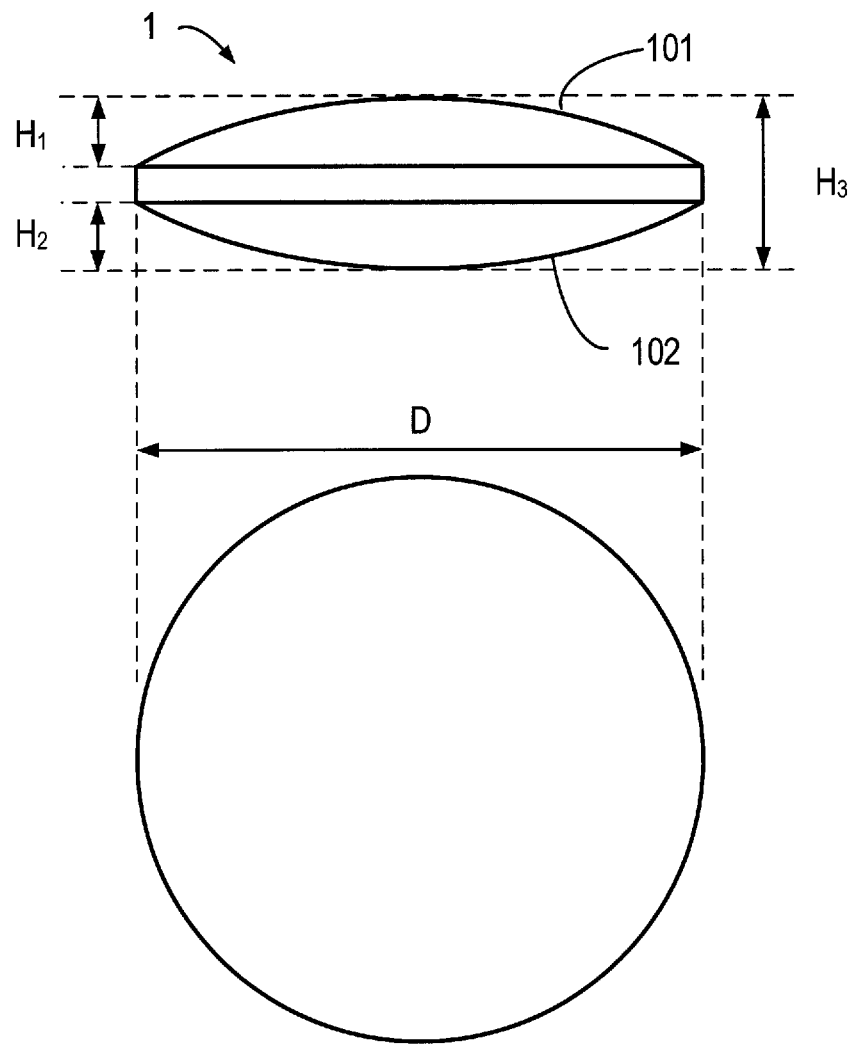
FIG. 2 shows an enlarged side view of the interacting body of an apparatus for use in a pointing device, according to embodiments of the present disclosure.

Still in reference to FIGS. 1 and 2, it can be seen that according to embodiments of the subject matter described herein, a profile of the upper surface 301 of the embossed portion 3 is substantially same as a profile of the lower surface 102 of the interacting body 1. Such profile match between two surfaces enables a better fit/contact between the interacting body 1 and force sensing layer 2, and thereby improves the response speed of the pointing device.

Alternatively, or in addition, a third surface 101 of the interacting body 1 as illustrated in FIG. 1a may include a high-friction layer 103 for contacting the tool 200 to receive the force F. In such embodiments, the finger slip can be effectively prevented, which thereby gives the user a better user experience. Typical high-friction layer 103 may include rubber, and sometimes small features such as small dimples may also be included in the high-friction layer 103 to increase the friction between user's finger 200 and the interacting body 1.

In some embodiments, an upper surface 101 of the interacting body 1 includes a curved portion to facilitate a translation of a force F applied on the upper surface 101 to cause a dip of the interacting body 1. In some embodiments as illustrated in FIGS. 1a and 1b, the entire upper surface 101 of the interacting body 1 constitutes a curved surface, for example, in a shape of the convex dome. In this case, when a user slides the finger on the upper surface 101 of the interacting body 1, the applied force F (for example, along direction R) can be easily decomposed to a downward component (that is, substantially perpendicular to direction R and pointing to the substrate 4) due to the convex dome, which eases the depression of the force sensing layer 2.

FIG. 2 shows an enlarged side view and cross-sectional view of an example design of the interacting body 1. It is to be noted that some parts of FIG. 2 may not to scale for the purpose of better illustration. In an implementation, the interacting body 1 has a cross-sectional dimension D of approximately 8 mm in diameter. The upper convex dome (that is, the upper surface 101) defines a projection height $H_1$ of approximately 0.3 mm, and the lower convex dome (that is, the lower surface 102) defines a projection height $H_2$ of approximately 0.1 mm. The entire height $H_3$ of the double-curved interacting body 1 in this example is approximately 0.8 mm. Such a low-profile interacting body 1 enables an overall reduced size of the pointing device 100, which is especially beneficial for the thin and light devices, such as thin and light notebook computers.

Figure 3A:
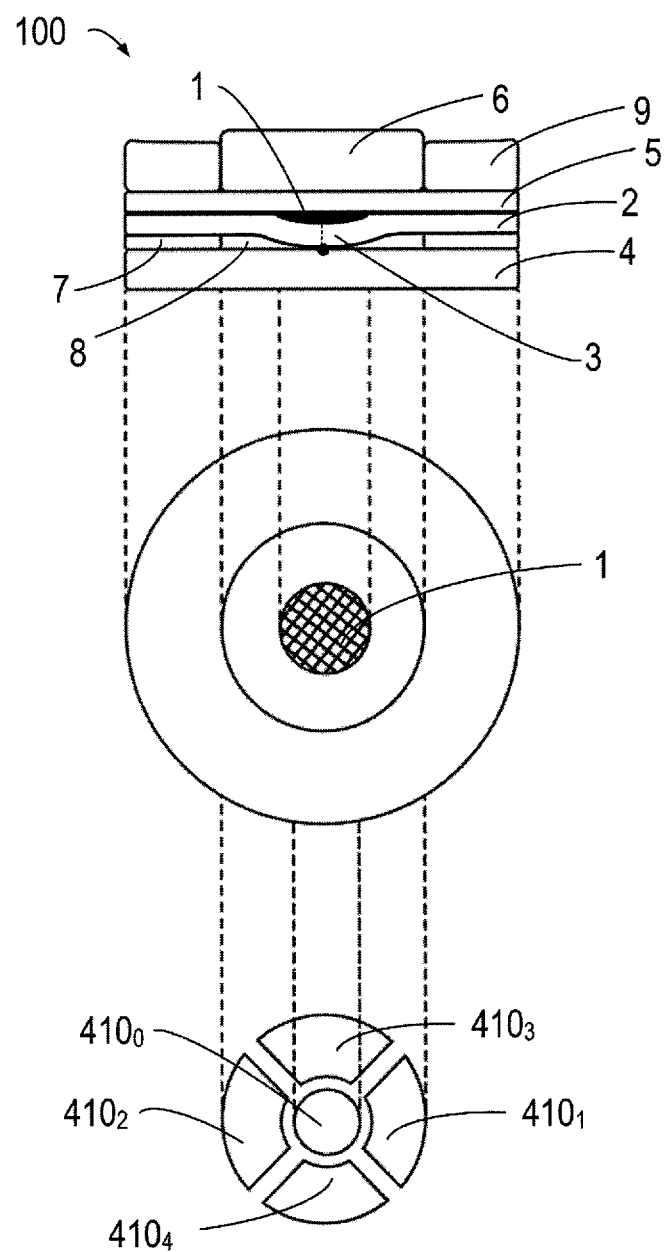
FIG. 3a is a schematic diagram illustrating the apparatus for use in a pointing device with no applied force thereon, according to embodiments of the present disclosure.

FIG. 3a illustrates a schematic side view of a pointing device 100 according to some other embodiments of the subject matter described herein. As illustrated in FIG. 3, the apparatus 10 as shown in FIG. 3 further includes a cover layer 5 (such as a cover film) and an operation mechanism 6. This cover layer 5 is overlaid on an upper surface 101 of the interacting body 1, and the operation mechanism 6 is arranged on top of the cover layer 5 and operable to receive the force F from the tool 200 such as user's finger and translate the force F via the cover layer 5 to the interacting body 1.

As further shown in FIG. 3a, the force sensing layer 2, the cover layer 5 and the interacting body 1 together form a "sandwich" layer structure. With this arrangement, instead of directly operating the interacting body 1 itself, a user may slide the tool 200 such as his/her finger on the operation mechanism 6, such as operation rod, to cause slight deformation of the whole sandwiched layer structure. The slight deformation will cause the movement of the contact point along the direction L from one point $P_6$ to another point $P_7$, as illustrated in FIG. 3b.

Figure 3B:
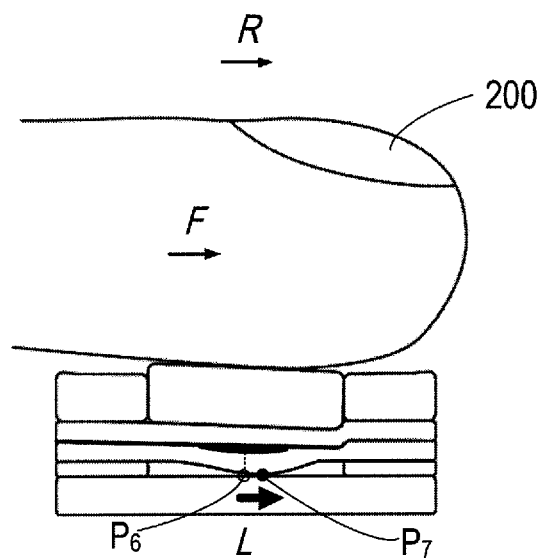
FIG. 3b is a schematic diagram illustrating the apparatus for use in a pointing device with an applied force thereon, according to embodiments of the present disclosure.
Figure 3C:
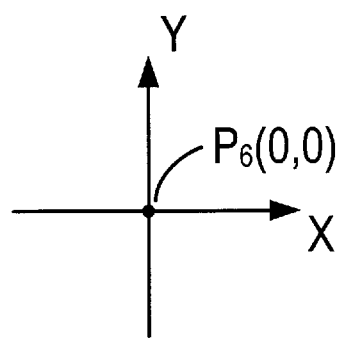
Figure 3D:
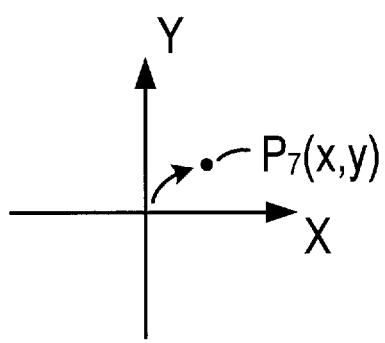
FIG. 3d shows the corresponding position output of the contact point of FIG. 3b.

FIGS. 3c and 3d show the corresponding position output of the contact point 401 in FIGS. 3a and 3b, respectively. As illustrated in FIGS. 3c and 3d, when there is a force F applied by a user's finger 200 on the operation mechanism 6, the contact point 401 will be moved from the original point $P_6$ (0, 0) to another point $P_7$ (x, y), in a similar manner as illustrated in FIGS. 1c and 1d.

The pointing device 100 as shown in FIG. 3a also includes one or more electrodes 401. The one or more electrodes 410 included in (for example, embedded in) the substrate 4 as illustrated in FIG. 3a then detect such a movement of the contact point 401 from $P_6$ (0, 0) to point $P_7$ (x, y). Basically, the one or more electrodes 410 each can detect the translated force from the interacting body 1. The displacement detection is done based on the contact position of the embossed portion 3 on the one or more electrodes. It is to be noted that scope of the subject matter described herein is not limited to the number or pattern of the electrodes. Though FIG. 3a illustrates five electrodes (labeled as $410_0$, $410_1$, $410_2$, $410_3$ and $410_4$, respectively), other number or distribution pattern of electrodes are also possible depending on specific requirements, for example the detection resolution requirements.

The apparatus 10 including the sandwich layer structure as illustrated in FIGS. 3a-3d is particularly beneficial for achieving ultra-small pointing device. Ultra-small pointing requires smaller interacting body 1 along with smaller embossed portion 3. However, for a fixed layer thickness, with a further reduced size of the embossed portion 3 (along with the reduced size of the interacting body 1), the permanently-shaped embossed portion 3 as described with reference to FIGS. 1a and 1b might no longer be easily achieved. This is mainly due to the unbalanced ratio between the layer thickness and the emboss size.

In particular, given a fixed layer thickness (for example, 25-100 micrometers), if the expected embossed portion 3 that is to be formed on the layer is too small (for example, less than 2 millimeters), such ultra-small embossed portion 3 may not be able to self-maintained on the force sensing layer 2. That is, the required ratio between the layer thickness and the emboss size for maintaining a permanently-shaped embossed portion 3 cannot be satisfied.

As a result, in order to achieve an ultra-small pointing device without thinning down the layer thickness (ultra-thin layer may increase the fabrication difficulty), in some embodiments, the embossed portion 3 is non-permanently shaped. In this case, the cover layer 5 and even the case 9 of the pointing device 100 are required to facilitate in maintaining the non-permanently shaped embossed portion 3.

As illustrated in FIG. 3a, when the ultra-small interacting body 1 is pressed by the cover layer 5 and the case 9 of the pointing device 100 against the force sensing layer 2, an ultra-small convex will be formed on the force sensing layer 2. Such small convex touches the center $410_0$ of position of the electrode(s) 410 to indicate the original position (0, 0) when no force from the user's finger is applied.

In some embodiments, the force sensing layer 2 has a thickness in a range of 25-100 micrometers, and the embossed portion 3 has a diameter in a range of 2-5 millimeters. It is to be noted that compared to a permanently-shaped embossed portion 3 where the diameter of the embossed portion is in a range of 10-20 mm for the given layer thickness of 25-100 micrometers, such emboss in the range of 2-5 millimeters allows for achieving a smaller pointing device that can be mounted on a small-sized device, such as smart phone and wearable device.

FIG. 4a shows a schematic of an electronic device 300 equipped with a point device 100 that is based on the non-permanently shaped emboss described as above. The electronic device 300 may be a mobile phone, a personal digital assistance (PDA), or the like. By utilizing such non-permanently shaped emboss, overall size of the point device can be significantly reduced. As a result, the pointing device 100 can be mounted into an area as narrow as a side 301 of an electronic device 300, for example, a side of 5 mm. FIG. 4b shows a schematic of a ring-shaped wearable device 400 mounted with a point device 10 that is likewise based on the non-permanently shaped emboss.

In some embodiments, the force sensing layer 2 and the cover layer 5 can be integrally formed, and the interacting body 1, in this case, can be injection molded. This integrally formed sandwich structure improves the integrity of the sandwich layer structure, which can avoid a potential strip of the cover layer 5 from the force sensing layer 2. Further, the injection molded interacting body 1 eases the fabrication process.

FIG. 5 illustrates a flowchart for manufacturing method 500 for a pointing device 100 described herein. It should be understood that the method 500 may also include additional actions not shown and/or omit the illustrated steps. Scope of the subject matter described herein is not limited in this aspect.

The method 500 will be described as below with reference to FIG. 5. At 502, a substrate 4 is provided. At 504, a rigid interacting body 1 is provided and operable to receive and translate a force F provided by a tool 200. At 506, a depressible force sensing 2 having an embossed portion 3 is arranged between the interacting body 1 and the substrate 4. At 508, a first surface 301 of the embossed portion 3 is caused to be in contact with a second surface 102 of the interacting body 1. At 510, a fourth surface 302 of the embossed portion 3 is caused to be in contact with the substrate 4 at a contact point 401, and the contact point 401 is movable in response to a depression of the embossed portion 3 caused by the force F.

Hereinafter, some example implementations of the subject matter described herein will be enumerate.

In some embodiments, an apparatus for use in a pointing device is provided. The apparatus comprise: a rigid interacting body operable to receive and translate a force provided by a tool; and a depressible force sensing layer arranged between the interacting body and a substrate, the force sensing layer having an embossed portion, the embossed portion including: a first surface in contact with a second surface of the interacting body, a profile of the first surface being substantially same as a profile of the second surface of the interacting body.

In some embodiments, the apparatus further comprises: a mechanism creating a gap between the substrate and the force sensing layer to receive the embossed portion.

In some embodiments, the embossed portion is permanently shaped.

In some embodiments, the force sensing layer has a thickness in a range of 25-100 micrometers, and the embossed portion has a diameter in a range of 10-20 millimeters.

In some embodiments, the force sensing layer is a force sensing resistive (FSR) layer.

In some embodiments, a third surface of the interacting body includes a high-friction layer for contacting the tool to receive the force.

In some embodiments, a third surface of the interacting body includes a curved portion to facilitate a translation of a lateral force applied on the first surface to cause a dip of the interacting body.

In some embodiments, the entire first surface is a curved surface.

In some embodiments, the apparatus further comprises: a cover layer overlaid on a third surface of the interacting body; and an operation mechanism arranged on the cover layer and operable to receive the force and translate the force via the cover layer to the interacting body.

In some embodiments, the embossed portion is non-permanently shaped, and the cover layer maintains the embossed portion.

In some embodiments, the force sensing layer has a thickness in a range of 25-100 micrometers, and the embossed portion has a diameter in a range of 2-5 millimeters.

In some embodiments, the force sensing layer and the cover layer are integrally formed, and the interacting body is injection molded.

In some embodiments, a pointing device is provided. The pointing device comprises: a substrate; a rigid interacting body operable to receive and translate a force provided by a tool; and a depressible force sensing layer arranged between the interacting body and the substrate, the force sensing layer having an embossed portion, the embossed portion including: a first surface in contact with a second surface of the interacting body, a profile of the first surface being substantially same as a profile of the second surface of the interacting body, and a fourth surface in contact with the substrate at a contact point, the substrate including at least one electrode to detect a movement of the contact point in response to a depression of the embossed portion caused by the force.

In some embodiments, the embossed portion is permanently shaped.

In some embodiments, the pointing device further comprises: a mechanism creating a gap between the substrate and the force sensing layer to receive the embossed portion.

In some embodiments, the force sensing layer is a force sensing resistive (FSR) layer.

In some embodiments, a third surface of the interacting body includes a curved portion to facilitate a translation of a lateral force applied on the third surface to cause a dip of the interacting body.

In some embodiments, the pointing device further comprises: a cover layer overlaid on a third surface of the interacting body; and an operation mechanism arranged on the cover layer and operable to receive the force and translate the force via the cover layer to the interacting body.

In some embodiments, the embossed portion is non-permanently shaped, and the cover layer maintains the embossed portion.

In some embodiments, a method for manufacturing an apparatus for use in a pointing device is provided. The method comprises: providing a substrate; providing a rigid interacting body operable to receive and translate a force provided by a tool; arranging a depressible force sensing layer between the interacting body and the substrate, the force sensing layer having an embossed portion; causing a first surface of the embossed portion to be in contact with a second surface of the interacting body, a profile of the first surface being substantially same as a profile of the second surface of the interacting body; and causing a fourth surface of the embossed portion to be in contact with the substrate at a contact point, the contact point being movable in response to a depression of the embossed portion caused by the force.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be included in the scope of protection of the present disclosure. Meanwhile, appended claims of the present disclosure aim to cover all the variations and modifications falling under the scope and boundary of the claims or equivalents of the scope and boundary.

What is claimed is:

1. An apparatus for use in a pointing device, comprising:
a rigid interacting body operable to receive and translate a force (F) provided by a tool, the rigid interacting body having a height, a first diameter, a lower surface, and an upper surface, wherein the rigid interacting body is at least one of non-deformable or non-depressible; and
a depressible force sensing layer arranged between the interacting body and a substrate, the force sensing layer having a second diameter greater than the first diameter of the interacting body and having an embossed portion, the embossed portion comprising:
an upper surface in contact with the lower surface of the interacting body, a curved cross-sectional profile of the upper surface of the embossed portion being substantially same as a curved cross-sectional profile of the lower surface of the interacting body.

2. The apparatus of claim 1, further comprising:
a mechanism creating a gap between the substrate and the force sensing layer to receive the embossed portion.

3. The apparatus of claim 1, wherein the embossed portion is permanently shaped.

4. The apparatus of claim 1, further comprising:
a cover layer overlaid on the upper surface of the interacting body; and
an operation mechanism arranged on the cover layer and operable to receive the force (F) and translate the force (F) via the cover layer to the interacting body.

5. The apparatus of claim 4, wherein the embossed portion is non-permanently shaped, and the cover layer maintains the embossed portion.

6. The apparatus of claim 3, wherein the force sensing layer has a thickness in a range of 25-100 micrometers, the embossed portion has a diameter in a range of 10-20 millimeters, and the diameter of the interacting body is approximately 8 millimeters.

7. The apparatus of claim 1, wherein the force sensing layer is a force sensing resistive (FSR) layer.

8. The apparatus of claim 1, wherein the upper surface of the interacting body includes a high-friction layer for contacting the tool to receive the force (F).

9. The apparatus of claim 1, wherein the upper surface of the interacting body includes a curved portion to facilitate a translation of a lateral force applied on the upper surface to cause a dip of the interacting body.

10. The apparatus of claim 9, wherein the entire upper surface is a curved surface.

11. The apparatus of claim 10, wherein the force sensing layer has a thickness in a range of 25-100 micrometers, and the embossed portion has a diameter in a range of 2-5 millimeters.

12. The apparatus of claim 9, wherein the force sensing layer and the cover layer are integrally formed, and the interacting body is injection molded.

13. A pointing device, comprising:
a substrate;
a rigid interacting body operable to receive and translate a force (F) provided by a tool, the interacting body having an upper surface and a lower surface, wherein the rigid interacting body is at least one of non-deformable or non-depressible;
a depressible force sensing layer arranged between the interacting body and the substrate, the force sensing layer having an embossed portion in continuous contact with the substrate when in a non-depressed state, the embossed portion comprising an upper surface and a lower surface, wherein:
the upper surface of the embossed portion is in contact with the lower surface of the interacting body, a curved cross-sectional profile of the upper surface of the embossed portion being substantially same as a curved cross-sectional profile of the lower surface of the interacting body; and
the lower surface of the embossed portion is in constant contact with the substrate at a contact point; and
the substrate including at least one electrode to detect a movement of the contact point in response to a depression of the embossed portion caused by the force (F).

14. The pointing device of claim 13, wherein the embossed portion is permanently shaped.

15. The pointing device of claim 13, further comprising:
a mechanism creating a gap between the substrate and the force sensing layer to receive the embossed portion.

16. The pointing device of claim 13, further comprising:
a cover layer overlaid on the upper surface of the interacting body; and
an operation mechanism arranged on the cover layer and operable to receive the force (F) and translate the force (F) via the cover layer to the interacting body.

17. The pointing device of claim 16, wherein the embossed portion is non-permanently shaped, and the cover layer maintains the embossed portion.

18. The pointing device of claim 13, wherein the force sensing layer is a force sensing resistive (FSR) layer.

19. The pointing device of claim 13, wherein the upper surface of the interacting body includes a curved portion to facilitate a translation of a lateral force applied on the upper surface of the interacting body to cause a dip of the interacting body.

20. A method for manufacturing a pointing device, comprising:
   providing a substrate;
   providing a rigid interacting body operable to receive and translate a force (F) provided by a tool, the interacting body having an upper surface and a lower surface, wherein the rigid interacting body is at least one of non-deformable or non-depressible; and
   arranging a depressible force sensing layer between the interacting body and the substrate, the force sensing layer having an embossed portion in continuous contact with the substrate when in a non-depressed state, the embossed portion comprising an upper surface and a lower surface, wherein:
      the upper surface of the embossed portion is in constant contact with the lower surface of the interacting body, a curved profile of the upper surface of the embossed portion being substantially same as a curved profile of the lower surface of the interacting body; and
      the lower surface of the embossed portion is in constant contact with the substrate at a contact point, the contact point being movable in response to a depression of the embossed portion caused by the force (F).

* * * * *